(12) United States Patent
Tanaka et al.

(10) Patent No.: US 8,691,926 B2
(45) Date of Patent: Apr. 8, 2014

(54) POLYMERIZATION CURABLE COMPOSITION

(75) Inventors: Nobuyuki Tanaka, Shunan (JP); Junji Momoda, Shunan (JP)

(73) Assignee: Tokuyama Corporation, Yamaguchi (JP)

( * ) Notice: Subject to any disclaimer, the term of this patent is extended or adjusted under 35 U.S.C. 154(b) by 662 days.

(21) Appl. No.: 11/667,317

(22) PCT Filed: Nov. 8, 2005

(86) PCT No.: PCT/JP2005/020782
§ 371 (c)(1),
(2), (4) Date: Nov. 5, 2007

(87) PCT Pub. No.: WO2006/051929
PCT Pub. Date: May 18, 2006

(65) Prior Publication Data
US 2008/0058444 A1    Mar. 6, 2008

(30) Foreign Application Priority Data

Nov. 9, 2004    (JP) ................................ 2004-325214

(51) Int. Cl.
C08F 236/20    (2006.01)
C08F 236/22    (2006.01)
C08F 4/32       (2006.01)

(52) U.S. Cl.
USPC ............. 526/336; 524/99; 526/204; 526/217; 526/227; 526/230.5; 526/321; 526/323.2; 526/325; 526/326

(58) Field of Classification Search
USPC ......... 524/99; 526/204, 217, 227, 230.5, 321, 526/323.2, 325, 326, 336
See application file for complete search history.

(56) References Cited

U.S. PATENT DOCUMENTS

| | | | |
|---|---|---|---|
| 3,713,869 A | 1/1973 | Geffcken et al. | |
| 4,261,656 A | 4/1981 | Wu | |
| 4,607,087 A * | 8/1986 | Moriya et al. ................ | 526/227 |
| 5,200,116 A * | 4/1993 | Heller ........................... | 252/586 |
| 5,200,483 A | 4/1993 | Selvig | |
| 5,556,931 A | 9/1996 | Imura et al. | |
| 5,963,373 A | 10/1999 | Kayanoki | |
| 6,034,193 A | 3/2000 | Henry et al. | |
| 6,391,433 B2 | 5/2002 | Jiang et al. | |
| 6,802,993 B2 | 10/2004 | Momoda et al. | |
| 6,864,299 B1 | 3/2005 | Komuro et al. | |
| 6,913,357 B2 | 7/2005 | Kadowaki | |
| 7,087,195 B2 | 8/2006 | Kawasaki | |
| 2003/0008149 A1 | 1/2003 | Moravec et al. | |
| 2003/0008958 A1 | 1/2003 | Momoda et al. | |
| 2003/0036579 A1 | 2/2003 | Momoda et al. | |
| 2005/0263745 A1 | 12/2005 | Momoda et al. | |
| 2006/0182977 A1 * | 8/2006 | Takenaka et al. .......... | 428/423.1 |

FOREIGN PATENT DOCUMENTS

| | | |
|---|---|---|
| EP | 0 404 599 A2 | 12/1990 |
| EP | 1 130 038 A1 | 9/2001 |
| EP | 1 359 170 A1 | 11/2003 |
| EP | 1 388 749 A1 | 2/2004 |
| EP | 1 433 814 A1 | 6/2004 |
| JP | 10-338869 A | 12/1998 |
| JP | 11-269233 A | 10/1999 |
| JP | 2002-105139 A | 4/2002 |
| JP | 2003-342310 A | 12/2003 |
| JP | 2004-131593 A | 4/2004 |
| JP | 2005-68192 A | 3/2005 |
| JP | 2005-239887 A | 9/2005 |
| WO | WO-01/05854 A1 | 1/2001 |
| WO | WO-02/48220 A1 | 6/2002 |
| WO | WO-02/093236 A1 | 11/2002 |
| WO | WO-03/099550 A1 | 4/2003 |
| WO | WO-03/099560 A1 | 4/2003 |
| WO | WO-2004/083268 A1 | 9/2004 |

OTHER PUBLICATIONS

Product data sheet for Tinuvin 770 DF, accessed from http://www.weiku.com/products/4028629/Tinuvin_770_DF.html on Aug. 19, 2011.*
Carlsson, D.J., Tovborg Jensen, J.P., Wiles, D. M., "Antioxidant Mechanisms of Hindered Amine Light Stabilizers", Die Makromolekulare Chemie 1984, vol. 8, Issue Supplement 8, pp. 79-88.*
Office Action issued by the USPTO in co-pending U.S. Appl. No. 10/549,696 on Sep. 7, 2007.
Office Action issued by the USPTO in co-pending U.S. Appl. No. 10/549,696 on Mar. 5, 2008.
Office Action issued by the USPTO in co-pending U.S. Appl. No. 10/549,696 on Sep. 22, 2008.
Office Action issued by the USPTO in co-pending U.S. Appl. No. 10/549,696 on Jun. 11, 2009.
Office Action issued by the USPTO in co-pending U.S. Appl. No. 10/549,696 on Mar. 11, 2009.
Office Action issued by the USPTO in co-pending U.S. Appl. No. 10/549,696 on Nov. 19, 2009.
Office Action issued in U.S. Appl. No. 10/549,696 on Apr. 16, 2010.
Final Office Action issued on Oct. 4, 2010 in U.S. Appl. No. 10/549,696.

* cited by examiner

*Primary Examiner* — Richard A Huhn
(74) *Attorney, Agent, or Firm* — Birch, Stewart, Kolasch & Birch, LLP

(57) ABSTRACT

A polymerization curable composition prepared by blending specific amounts of a photochromic compound and a specific light stabilizer such as bis(1,2,2,6,6-pentamethyl-4-piperidyl)sebacate with monomer components including a specific bifunctional monomer having a structure that two phenylene groups are bonded together by a specific group, such as 2,2-bis(4-methacryloyloxypolyethoxyphenyl)propane, a polyfunctional polymerizable monomer having a functionality of 3 or more such as trimethylolpropane trimethacrylate, and a monomer other than these in a specific ratio.
The polymerization curable composition provides a cured product having excellent photochromic properties such as fast fading rate and sufficiently high drilling strength that allows for its use in rimless spectacles and has high long-term storage stability.

10 Claims, No Drawings

POLYMERIZATION CURABLE COMPOSITION

FIELD OF THE INVENTION

The present invention relates to a polymerization curable composition which provides a cured product having excellent photochromic properties and strength characteristics and which has high storage stability.

DESCRIPTION OF THE PRIOR ART

Photochromic spectacles function as sunglasses outdoors where their lenses darken swiftly upon exposure to light including ultraviolet radiation such as sunlight and as normal transparent spectacles indoors where their lenses recover transparency without exposure. Demand for photochromic plastic spectacles in particular is growing.

As one of the methods of manufacturing a plastic spectacle lens having photochromism, there is known a method for obtaining a photochromic lens by dissolving a photochromic compound in a polymerizable monomer composition and polymerizing it (to be referred to as "inmass method" hereinafter). The method in which photochromism is provided simultaneous with the manufacture of a lens has an advantage that a photochromic plastic lens is obtained in a single step, as compared with a method in which photochromism is provided after a lens is molded.

Photochromism is developed when a photochromic compound absorbs optical energy to cause a reversible structural change. In a photochromic plastic lens obtained by the inmass method, as a photochromic compound is dispersed in a cured matrix, photochromic properties such as color development density and fading rate inherent to the photochromic compound cannot be fully developed in most cases. This is because the structural change of the molecule of the photochromic compound is readily restricted due to a very small free space in the above matrix as compared with that in a solution. This tendency is marked when a high molecular weight photochromic compound is dispersed in a cured matrix having high hardness and heat resistance. For example, when a photochromic compound having a molecular weight of 300 or more is dispersed in a curable composition which is commonly used as a plastic lens matrix, the fading half-life of the photochromic compound becomes very long (fading rate becomes very low), and the fading half-life of the photochromic compound in the cured matrix may become 50 times or more longer than the fading half-life of the photochromic compound in the solution.

As a curable composition which provides a photochromic cured product free from the above problem, that is, having excellent photochromic properties and high hardness and heat resistance, there is known a polymerization curable composition (may also be referred to as "prior art composition" hereinafter) which comprises (A) a polymerizable monomer having an L scale Rockwell hardness of its homopolymer of 40 or less, (B) a polymerizable monomer having a functionality of 3 or more and an L scale Rockwell hardness of its homopolymer of 60 or more, (C) a bifunctional polymerizable monomer having an L scale Rockwell hardness of its homopolymer of 60 or more, and (D) a photochromic compound (see the pamphlet of International Publication No. WO01/05854).

The above prior art composition is extremely useful as a raw material composition for manufacturing a photochromic plastic lens by the inmass method. It has been found that when a cured product obtained by curing the composition is to be used in rimless spectacles which have been popular (rimless spectacles comprising lenses having a screw hole and arm members for securing the respective lenses at the time of use, both of which are interconnected by hinges screwed into the lenses), the lens may be cracked by drilling a hole in the lens, or the lens of a fixed portion may be broken by applying a load to the fixed arm member even if there is no problem at the time of drilling.

Then, the composition of the above prior art composition was studied in order to find the reason why strength at the time of drilling or after drilling (may also be referred to as "drilling strength" hereinafter) lowers. As a result, it has been found that when the amount of the "polymerizable monomer having a functionality of 3 or more and an L scale Rockwell hardness of its homopolymer of 60 or more" (may also be referred to as "polyfunctional monomer" hereinafter) is large, the drilling strength of the cured product greatly lowers. It is considered from this fact that the amount of the polyfunctional monomer should be reduced to improve the drilling strength but it has been found that there exists trade-off relationship that it is difficult to obtain excellent photochromic properties when the amount of the polyfunctional monomer is too small. When further studies have been made based on this finding, it has been found that a photochromic curable composition (may be also referred to as "improved composition" hereinafter) comprising a specific amount of the above polyfunctional monomer contained in the polymerization curable composition and a specific amount of a specific polymerizable monomer having a structure that two phenylene groups are bonded together by a specific group as the bifunctional polyemrizable monomer can satisfy the above requirement, and the composition has been proposed (refer to JP-A 2005-68192).

The above improved composition provides a cured product having the following excellent features. That is, the fading half-life of the photochromic compound in the cured product is 30 times or less longer than the fading half-life of the photochromic compound in the solution, and the cured product has a tensile strength defined hereinbelow of 20 Kgf or more.

The term "fading half-life" as used herein means the time required for absorbance at a maximum wavelength to be reduced to $\frac{1}{2}$ of absorbance at the time of color development when exposure is stopped after the photochromic compound develops color by exposure and is an index value for fading rate which is one of the most important photochromic properties. That the fading half-life of the photochromic compound contained in the matrix is 30 times or less, preferably 10 times or less, more preferably 7 times or less, particularly preferably 5 times or less longer than the fading half-life of the photochromic compound in the solution means that the photochromic compound has excellent photochromic properties. Although the solvent for the above photochromic compound solution is not particularly limited, ethylene glycol dimethyl ether is used as a standard solvent The absolute value of the fading half-life of the cured product is 4 minutes or less, preferably 2 minutes or less.

The tensile strength is an index for drilling strength. It means tensile strength obtained by a tensile test in which two 2 mm-diameter holes are drilled in a 1 to 5 mm-thick disk-like test sample that may be curved and has a main surface area of 10 to 40 $cm^2$ with two points existent on any straight line passing through the center of gravity or near the center of gravity of the test sample and crossing the test sample and 4 mm inward from two points of intersection between the straight line and the periphery of a substrate as the centers thereof, and two 1.6 mm-diameter stainless steel rods are inserted into the obtained two holes and fixed to the upper and lower chucks of the tensile tester, respectively, and pulled at a rate of 5 mm/min. In the tensile strength test defined above, the destruction of the test sample usually occurs near the drilled holes, and the tensile strength of what is generally used as a spectacle lens is rarely affected by the shape of a matrix. Since the shape and size of a spectacle lens before and after it is processed into an ordinary use form are within the ranges of the above test sample, the above tensile strength becomes an index for the drilling strength of a spectacle lens as it is. When the above tensile strength is used as an index for the drilling strength of a spectacle lens, it is preferred that one of the two holes should be drilled at the same position or almost the same position as when a rimless frame (that is, an arm member connected to a hinge) is attached to the spectacle lens processed into the actual use form to carry out a tensile test.

The tensile strength of a spectacle lens which can be used in rimless spectacles is 20 Kgf or more. When the tensile strength is 20 Kgf or more, it means that good results are obtained from the monitor use of the spectacle lens in rimless spectacles and a large crack (a length of 0.4 mm or less) is not made by drilling a 2 mm-diameter hole at any position of a matrix at a revolution of 2,100 rpm (a speed of 1 hole/second or less as a standard).

The improved composition provides a cured product which can be advantageously used as a photochromic plastic lens for use in rimless spectacles. When further studies have been made on this composition, it has been found that the composition has a problem with storage stability. Although the polymerizable monomer itself used in the above improved composition does not deteriorate even after it is kept at a low temperature (10° C. or lower) for 1 year, when it is mixed with a photochromic compound (coloring matter) and kept, the composition yellows due to the deterioration of the coloring matter. When a photochromic lens is manufactured from the yellowed composition, the obtained lens is colored under no illumination.

SUMMARY OF THE INVENTION

It is therefore an object of the present invention to provide a composition which improves the storage stability of the above improved composition and can exhibit the excellent features of the improved composition without the deterioration of its quality even when it is kept for a long time.

The inventors of the present invention have conducted intensive studies to attain the above object and have found that the above object can be attained by blending a specific light stabilizer with a polymerizable monomer composition in a specific ratio. The present invention has been accomplished based on this finding.

That is, the present invention is a polymerization curable composition comprising:

(I) 100 parts by mass of a polymerizable monomer composition consisting of (I-1) 10 to 80 masse of a bifunctional polymerizable monomer represented by the following formula (1), (I-2) 1 to 15 mass % of a polyfunctional polymerizable monomer represented by the following formula (2), and (I-3) 5 to 89 mass % of a polymerizable monomer other than (I-1) and (I-2);

(II) 0.001 to 5 parts by mass of a photochromic compound; and (III) 0.001 to 0.5 part by mass of a light stabilizer which is a compound having a 2,2,6,6-tetramethyl-4-piperidyl skeleton, particularly preferably a compound represented by the following formula (3).

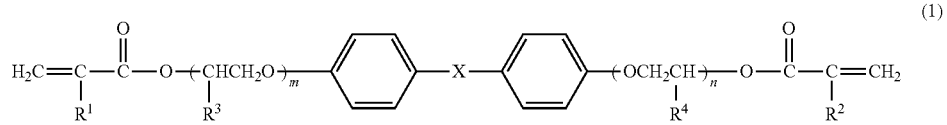

(1)

wherein $R^1$ and $R^2$ are each independently a hydrogen atom or methyl group, $R^3$ and $R^4$ are each independently hydrogen atom or alkyl group having 1 or 2 carbon atoms, —X— is —O—, —S—, —S(=O)$_2$—, —C(=O)—O—, —CH$_2$—, —CH=CH— or —C(CH$_3$)$_2$—, and m and n are each independently an integer which satisfies (m+n)=2 to 30.

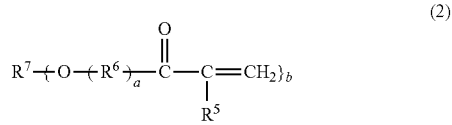

(2)

wherein $R^5$ is a hydrogen atom or methyl group, —$R^6$— is —CH$_2$CH$_2$O—, —CH$_2$CH(CH$_3$) O— or —C(=O) CH$_2$CH$_2$CH$_2$CH$_2$CH$_2$O —, $R^7$ is a tervalent or hexavalent organic residue, a is an integer of 0 to 3, and b is an integer of 3 to 6.

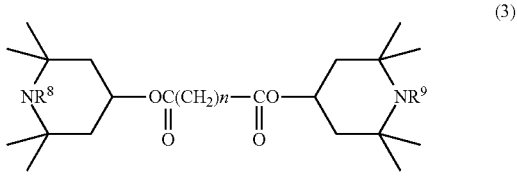

(3)

wherein $R^8$ and $R^9$ are each independently a hydrogen atom or methyl group, and n is an integer of 5 to 12.

BEST MODE FOR THE EMBODIMENT OF THE INVENTION

The polymerization curable composition of the present invention comprises a specific polymerizable monomer composition (may be referred to as "monomer composition" hereinafter) (I), a photochromic compound (II) and a specific light stabilizer (III). By using the above specific monomer composition (I) as a polymerizable monomer component, the obtained cured product has high drilling strength and excellent photochromic properties. A description is first given of the above polymerizable monomer composition (I).

The monomer composition (I) used in the present invention consists of the following components (I-1), (I-2) and (I-3) (the total amount of these components is 100 mass %). (I-1) a bifunctional polymerizable monomer component (may also be referred to as "specific bifunctional monomer" hereinafter) represented by the above formula (1) (I-2) a polyfunctional polymerizable monomer component represented by the above formula (2) (may also be referred to as "specific polyfunctional monomer" hereinafter) (I-3) a polymerizable monomer other than (I-1) and (I-2) (may also be referred to as "other monomer" hereinafter)

In the above formulas (1) and (2), $R^1$, $R^2$ and $R^5$ are each independently a hydrogen atom or methyl group, and $R^3$ and $R^4$ are each independently a hydrogen atom or alkyl group having 1 or 2 carbon atoms, that is, methyl group or ethyl group. —X— is —O—, —S—, —S($=$O)$_2$—, —C($=$O)—C—, —CH$_2$—, —CH$=$CH— or —C(CH$_3$)$_2$—, and —R$^6$— is —CH$_2$CH$_2$O—, —CH$_2$CH(CH$_3$)O— or —C($=$O)CH$_2$CH$_2$CH$_2$CH$_2$O—. $R^7$ is a tervalent to hexavalent organic residue, preferably a tervalent to hexavalent hydrocarbon group, the most preferably a tervalent hydrocarbon group. A preferred example of $R^7$ is (—CH$_2$)$_3$C—C$_c$H$_{2c+1}$ (c is an integer of 1 to 3). Exemplary structures of the group are shown below.

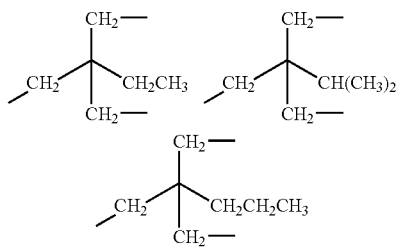

Further, m and n are each independently an integer which satisfies (m+n)=2 to 30, and a and b are an integer of 0 to 3 and an integer of 3 to 6, respectively.

Out of specific bifunctional monomers constituting the above component (I-1), a bifunctional monomer of the above formula (1) in which (m+n) is less than 8 corresponds to the component (C) in the prior art composition disclosed by the pamphlet of International Publication No. WO01/05854, that is, a polymerizable monomer included in bifunctional polymerizable monomers having an L scale Rockwell hardness of their homopolymers of 60 or more. A bifunctional monomer of the above formula (1) in which (m+n) is 8 or more corresponds to the component (A) of the prior art composition, that is, a polymerizable monomer having an L scale Rockwell hardness of its homopolymer of 40 or less.

The term "L scale Rockwell hardness" as used herein is a value determined based on JIS K7202, specifically a value obtained based on the equation (130-500 h) from a difference h (unit: mm) in the depth of penetration of an indenter between when a standard load of 10 Kgf is first applied to the surface of a cured test sample by using a steel ball having a diameter of 6.350 mm as an indenter and when the standard load is returned after a test load of 60 Kgf is applied to the surface of the test sample.

Illustrative examples of the specific bifunctional monomer as the component (I-1) which is easily acquired and can be advantageously used include 2,2-bis[(4-methacryloyloxypolyethoxy)phenyl]propane (average value of (m+n) is 2), the same as above (average value of (m+n) is 2.6), the same as above (average value of (m+n) is 4), the same as above (average value of (m+n) is 10), the same as above (average value of (m+n) is 30), 2,2-bis[4-(acryloyloxypolyethoxy]phenyl]propane (average value of (m+n) is 4), 2,2-bis[4-(methacryloyloxypolypropoxy)phenyl]propane (average value of (m+n) is 4), the same as above (average value of (m+n) is 10), bis[4-(methacryloyloxypolyethoxy)phenyl]methane (average value of (m+n) is 4), and bis[4-(methacryloyloxypolyethoxy)phenyl]sulfone (average value of (m+n) is 4). They may be used alone or in combination of two or more.

The content of the component (I-1) in the monomer composition (I) must be 10 to 80 mass % based on the total mass of all the monomer components contained in the composition (I). When the content of the component is lower than 10 mass %, strength or toughness required for rimless spectacles is not obtained. When the content is higher than 80 masse, the viscosity of the obtained composition becomes too high, thereby making it difficult to handle it, and the structure of the obtained cured product becomes too stiff, thereby restricting the molecular movement of the photochromic compound and making it impossible to obtain satisfactory photochromic properties (long fading half-life). For these reasons, the content of the component (I-1) is preferably 20 to 60 mass % based on the above standard.

The component (I-2) which is a polyfunctional monomer represented by the above formula (2) corresponds to the component (B) in the prior art composition disclosed by the pamphlet of International Publication No. WO01/05854, that is, a polymerizable monomer having a functionality of 3 or more and an L scale Rockwell hardness of its homopolymer of 60 or more. By using the polymerizable monomer, a cured product having excellent photochromic properties typified by fading half-life can be obtained. Examples of the above specific polyfunctional monomer which is be easily acquired and can be advantageously used include trimethylolpropane trimethacrylate, trimethylolpropane triacrylate, tetramethylolmethane trimethacrylate, tetramethylolmethane triacrylate, trimethylolpropane trimethacrylate, tetramethylolmethane tetramethacrylate, tetramethylolmethane tetraacrylate, trimethylolpropane triethylene glycol trimethacrylate, trimethylolpropane triethylene glycol triacrylate, ethoxylated pentaerythritol tetraacrylate, ethoxylated pentaerythritol tetramethacrylate, pentaerythritol trimethacrylate, pentaerythritol tetramethacrylate, caprolactam modified ditrimethylolpropane tetraacrylate, caprolactam modified ditrimethylolpropane tetramethacrylate and caprolactam modified dipentaerythritol hexaacrylate. They may be used alone or in combination of two or more.

The content of the specific polyfunctional monomer as the component (I-2) in the composition of the present invention is 1 to 15 mass %, preferably 3 to 10 mass % based on the total mass of all the monomer components contained in the monomer composition (I). When the content of the component (I-2) is lower than 1 mass %, satisfactory photochromic properties are not obtained and when the content is higher than 15 mass %, strength (toughness) required for rimless spectacles is not obtained. The preferred content of the component (I-2) depends on the content of the specific bifunctional monomer as the component (I-1). It is preferred that when the content of the component (I-1) is lower than 40 mass %, the content of the component (I-2) should be 1 to 10 mass % and when the content of the component (I-1) is 40 mass % or more, the content of the component (I-2) should be 3 to 15 mass %. A cured product having good balance between photochromic properties and strength can be thereby obtained.

The monomer composition (I) used in the polymerization curable composition of the present invention comprises a polymerizable monomer component other than the above components (I-1) and (I-2) (may also be referred to as "other monomer" hereinafter) in an amount of 5 to 89 masse. The "other monomer" is preferably a monomer other than polymerizable monomers (polyfunctional polymerizable monomers) having a functionality of 3 or more and an L scale Rockwell hardness of 60 or more. The following monomers enumerated as the components (A) and (C) (excluding the specific bifunctional monomer) used in the curable composition (prior art composition) disclosed in the pamphlet of the above WO01/05854 may be preferably used.

Preferred examples of the monomer as the component (I-3) corresponding to the component (A) include polyethylene glycol methacrylate having an average molecular weight of 526, polyethylene glycol methacrylate having an average molecular weight of 360, methyl ether polyethylene glycol methacrylate having an average molecular weight of 475, methyl ether polyethylene glycol methacrylate having an average molecular weight of 1,000, polypropylene glycol methacrylate having an average molecular weight of 375, polypropylene glycol methacrylate having an average molecular weight of 430, stearyl methacrylate, lauryl methacrylate, ethylene glycol glycidyl ether, propylene glycol glycidyl ether, tetraethylene glycol diacrylate, nonaethylene glycol diacrylate, polyethylene glycol allyl ether having an average molecular weight of 200, polyethylene glycol allyl ether having an average molecular weight of 1,500, methoxy polyethylene glycol allyl ether having an average molecular weight of 350, methoxy polyethylene glycol allyl ether having an average molecular weigh of 550, methoxy polyethylene glycol allyl ether having an average molecular weight of 1,500, and methoxy polyethylene glycol polypropylene glycol allyl ether having an average molecular weight of 620.

Examples of the component (I-3) corresponding to the component (C) include diethylene glycol dimethacrylate, triethylene glycol dimethacrylate, tetraethylene glycol dimethacrylate, nonaethylene glycol dimethacrylate, nonapropylene glycol dimethacrylate, ethylene glycol bisglycidyl methacrylate, 1,4-butylene glycol dimethacrylate, 1,9-nonylene glycol dimethacrylate and neopentylene glycol dimethacrylate.

Further, examples of the polymerizable monomer other than the component (A) and the component (C) as the "other monomer" include polyallyl compounds such as diallyl phthalate, diallyl isophthalate and diallyl tartrate; acrylic ester compounds and methacrylic ester compounds such as glycidyl acrylate, glycidyl methacrylate, methyl acrylate, methyl methacrylate and benzyl methacrylate; and vinyl compounds such as styrene, chlorostyrene, methylstyrene, vinylnaphthalene, α-methylstyrene dimer, bromostyrene and divinyl benzene.

Further, bifunctional to hexafunctional polymerizable polyurethane oligomers and bifunctional to hexafunctional polymerizable polyester oligomers may be advantageously used.

The bifunctional to hexafunctional polymerizable polyurethane oligomers are obtained by adding hydroxyacrylic acid or hydroxymethacrylic acid to the remaining isocyanate group on a polyurethane skeleton synthesized from a diisocyanate and a polyol. Examples of the diisocyanate include tolylene diisocyanate, 4,4-diphenylmethane diisocyanate, xylylene diisocyanate, hexamethylene diisocyanate, isophorone diisocyanate, methylenebis(4-cyclohexylisocyanate) and trimethylhexamethylene diisocyanate. Examples of the polyol include polypropylene oxide diol, copolyethylene oxide-propylene oxide diol, polytetramethylene oxide diol, ethoxylated bisphenol A, ethoxylated bisphenol S spiroglycol, caprolactam modified diol, carbonate diol, polyester diol, diethylene glycol, triethylene glycol, 1,6-hexanediol, trimethylolpropane, ethoxylated trimethylolpropane and pentaerythritol.

The bifunctional to hexafunctional polymerizable polyester oligomers are obtained by condensing acrylic acid or methacrylic acid to the remaining hydroxyl group on a polyester skeleton synthesized from a polyol and a polybasic acid.

Examples of the polyol include the same polyols enumerated for the above bifunctional to hexafunctional polymerizable polyurethane oligomers and examples of the polybasic acid include phthalic anhydride, adipic acid and trimellitic acid.

The polymerization curable composition of the present invention comprises a photochromic compound as the component (II). As the photochromic compound may be used a known photochromic compound such as chromene compound, fulgimide compound or spirooxazine compound without restrictions. When a high molecular weight photochromic compound having a molecular weight of 200 or more, particularly 500 or more is used, the effect of the present invention, especially the effect that the obtained cured product exhibits excellent photochromic properties is marked. Therefore, a photochromic compound having a high molecular weight as above is preferably used. Out of these photochromic compounds, chromene compounds are particularly preferred because they have higher photochromism than other compounds and are superior in color development density and fading rate. Out of the above chromene compounds, indenonaphthopyran compounds represented by the following formula (4), naphthopyran compounds represented by the following formula (5), and naphthopyran compounds represented by the following formula (6) are particularly preferred.

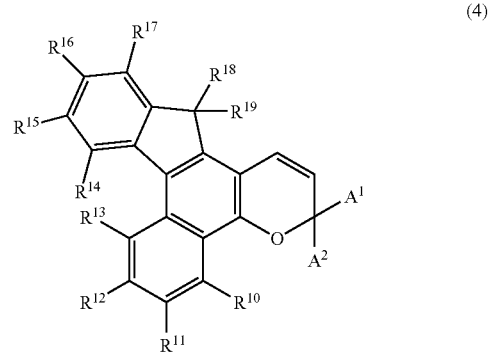

(4)

wherein $R^{10}$, $R^{11}$, $R^{12}$, $R^{13}$, $R^{14}$, $R^{15}$, $R^{16}$, $R^{17}$, $R^{18}$ and $R^{19}$ are each independently a hydrogen atom, alkyl group, alkoxy group, aralkoxy group, substituted amino group, cyano group, halogen atom, aralkyl group, aryl group which may have a substituent, or nitrogen substituted cyclic compound such as morpholino, piperidino or piperazino, $R^{18}$ and $R^{19}$ may be bonded together to form a cycloalkyl which may have a substituent, and $A^1$ and $A^2$ are each independently a hydrogen or aryl group which may have a substituent.

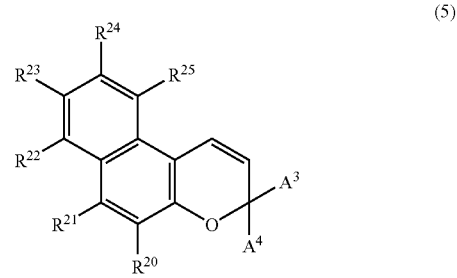

(5)

wherein $R^{20}$, $R^{21}$, $R^{22}$, $R^{23}$, $R^{24}$ and $R^{25}$ are each independently a hydrogen atom, alkyl group, alkoxy group, aralkoxy group, substituted amino group, cyano group, halogen atom, aralkyl group, aryl group which may have a substituent or nitrogen substituted cyclic compound such as morpholino, piperidino or piperazino, and $A^3$ and $A^4$ are each independently a hydrogen atom or aryl group which may have a substituent.

(6)

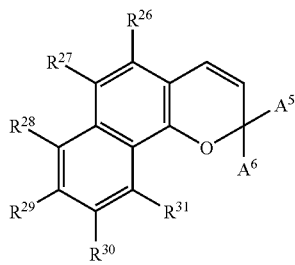

wherein $R^{26}$, $R^{27}$, $R^{28}$, $R^{29}$, $R^{30}$ and $R^{31}$ are each independently a hydrogen atom, alkyl group, alkoxy group, aralkoxy group, substituted amino group, cyano group, halogen atom, aralkyl group, aryl group which may have a substituent or nitrogen substituted cyclic compound such as morpholino, piperidino or piperazino, and $A^5$ and $A^6$ are each independently a hydrogen atom or aryl group which may have a substituent.

Illustrative examples of the photochromic compound which can be advantageously used in the present invention include the following compounds. Although they may be used alone, they are used in combination with one or two or more other photochromic compounds (including the following compounds and other photochromic compounds) in most cases in order to adjust a developed color.

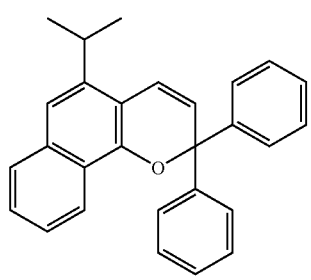

Molecular weight of 376

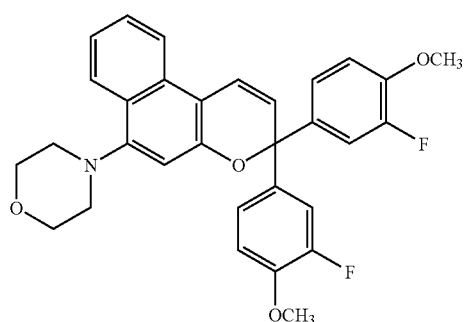

Molecular weight of 515

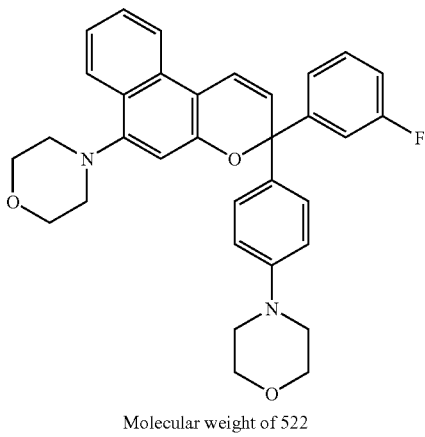

Molecular weight of 522

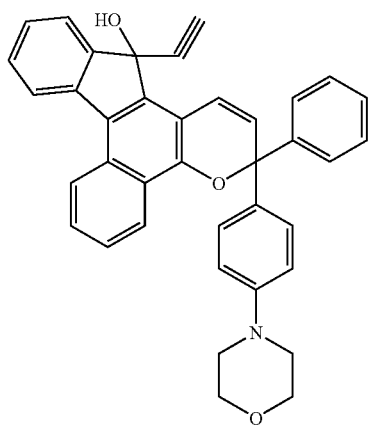

Molecular weight of 547

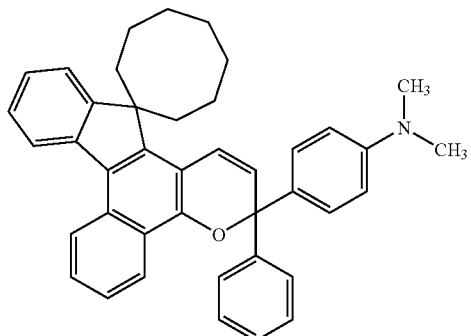

Molecular weight of 561

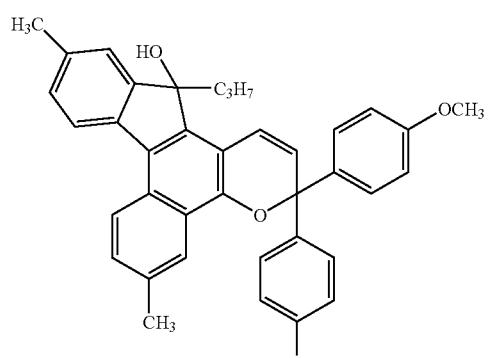

Molecular weight of 568

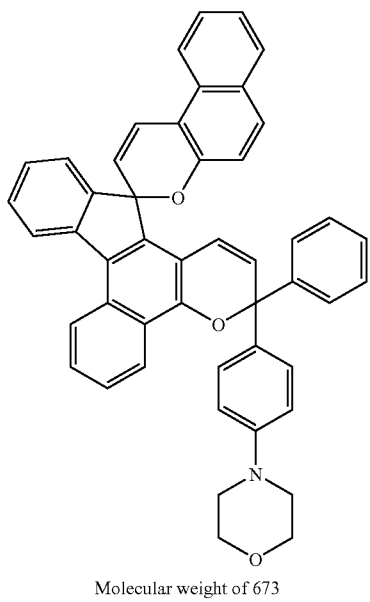

Molecular weight of 673

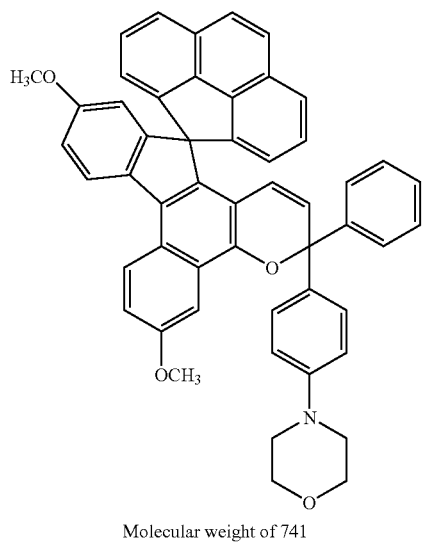

Molecular weight of 741

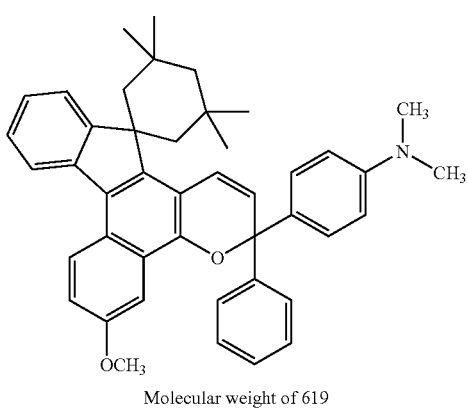

Molecular weight of 619

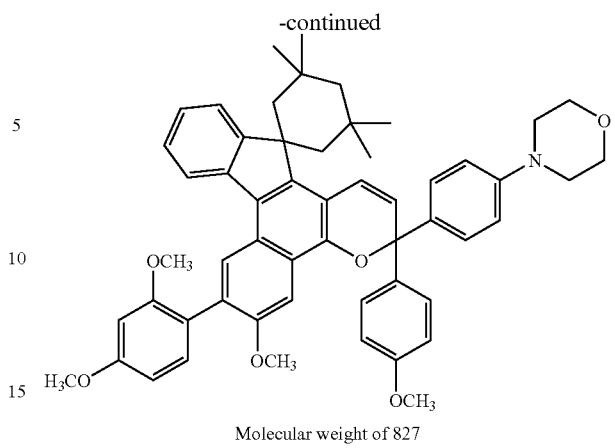

Molecular weight of 827

Out of the compounds represented by the above formulas (4), (5) and (6), compounds of the formula (4) in which at least one of $A^1$ and $A^2$ is an aryl group substituted by a dialkylamino group, compounds of the formula (5) in which at least one of $A^3$ and $A^4$ is an aryl group substituted by a dialkylamino group, and compounds of the formula (6) in which at least one of $A^5$ and $A^6$ is an aryl group substituted by a dialkylamino group are particularly useful as they have the large effect of suppressing deterioration by a light stabilizer represented by the above formula (3).

The amount of the photochromic compound in the polymerization curable composition of the present invention must be 0.001 to 5 parts by mass based on 100 parts by mass of the above polymerizable monomer composition (I). When the amount of the photochromic compound is smaller than 0.001 part by mass based on the above standard, sufficiently high color development density is not obtained and when the amount is larger than 5 parts by mass, it is difficult to disperse the photochromic compound uniformly. From the viewpoints of color development density and uniform dispersibility, the amount of the photochromic compound is preferably 0.01 to 2 parts by mass based on the above standard.

The polymerization curable composition of the present invention comprises a light stabilizer which is a compound having a 2,2,6,6-tetramethyl-4-piperidyl skeleton as the component (III). When the polymerization curable composition comprises the component (III), its storage stability is improved, the photochromic compound does not deteriorate after it is kept for a long time, and it can exhibit excellent features inherent to the improved composition. When a compound other than the above compounds is used as the light stabilizer, it is difficult to obtain a satisfactory stabilizing effect. Preferred examples of the light stabilizer include bis(2,2,6,6-tetramethyl-4-piperidyl)sebacate, bis(1,2,2,6,6-pentamethyl-4-piperidyl)sebacate, bis(1-octyloxy-2,2,6,6-tetramethyl-4-piperidyl)sebacate, 1-[2-{3-(3,5-di-t-butyl-4-hydroxyphenyl)propionyloxy}ethyl]-4-{3-(3,5-di-t-butyl-4-hydroxyphenyl)propionyloxy}-2,2,6,6-tetramethylpiperidine, 4-benzoyloxy-2,2,6,6-tetramethylpiperidine, methyl(1,2,2,6,6-pentamethyl-4-piperidyl)sebacate, 1,2,2,6,6-pentamethyl-4-piperidinyl methacrylate and poly[{6-(1,1,3,3-tetramethylbutyl)amino-1,3,5-triazin-2,4-diyl}{2,2,6,6-tetramethyl-4-piperidyl}imino]hexamethylene{(2,2,6,6-tetramethyl-4-piperidyl)imino}].

Out of these, a light stabilizer which is a compound represented by the above formula (3) is particularly preferred because it is easily acquired, has a large effect and can be easily handled. Typical examples of the compound include bis(2,2,6,6-tetramethyl-4-piperidyl)sebacate, bis(1,2,2,6,6-pentamethyl-4-piperidyl)sebacate and bis(1-octyloxy-2,2,6,6-tetramethyl-4-piperidyl)sebacate.

The amount of the component (III) in the curable composition of the present invention must be 0.001 to 0.5 part by mass based on 100 parts by mass of the polymerizable monomer composition (I). When the amount of the component (III) is smaller than 0.001 part by mass based on the above standard, the satisfactory effect of preventing the deterioration of coloring matter is not obtained and when the amount is larger than 0.5 part by mass, the light stabilizer itself is colored and therefore, the obtained cured product may be colored. The amount of the light stabilizer is preferably 0.005 to 0.3 part by mass based on the above standard to obtain the effect of the present invention and the satisfactory effect of the light stabilizer.

Various additives may be added to the polymerization curable composition of the present invention in order to improve the durability, color developing rate and fading rate of the photochromic compound and moldability as far as the effect of the present invention is not adversely affected. Additives which can be advantageously used include a surfactant, antioxidant, radical scavenger, ultraviolet light absorber, release agent, coloring inhibitor, antistatic agent, fluorescent dye, dye, pigment, perfume and silane coupling agent for improving the adhesion of a hard coat.

The above surfactant may be nonionic, anionic or cationic. Hindered phenol antioxidants, phenolic radical scavengers, sulfur-based antioxidants, benzotriazole-based compounds and benzophenone-based compounds are preferably used as the antioxidant, radical scavenger and ultraviolet light absorber. Silicone-based compounds are used as the release agent. Examples of the silane coupling agent include γ-methacryloyloxypropyltrimethoxysilane, γ-methacryloyloxypropyltriethoxysilane, γ-methacryloyloxypropylmethyldimethoxysilane, γ-aminopropyltrimethoxysilane and γ-glycidoxypropyltrimethoxysilane.

The amounts of the surfactant and the silane coupling agent are each preferably 0 to 20 parts by mass based on 100 parts by mass of the total of all the polymerizable monomers. The amounts of the antioxidant, radical scavenger, ultraviolet light absorber, release agent, coloring inhibitor, antistatic agent, fluorescent dye, dye, pigment and perfume are each preferably 0 to 2 parts by mass based on 100 parts by mass of the total of all the polymerizable monomers.

The method of manufacturing a cured product by curing the above polymerization curable composition is not particularly limited. After predetermined amounts of the above components are suitably mixed together to prepare the polymerization curable composition of the present invention, the polymerization curable composition can be cured by thermopolymerization and/or photopolymerization. A thermopolymerization initiator and/or a photopolymerization initiator may be used as required.

Examples of the thermopolymerization initiator include diacyl peroxides such as isobutyryl peroxide (10-hour half-life temperature: 33° C.), 2,4-dichlorobenzoyl peroxide (54° C.), o-chlorobenzoyl peroxide (54° C.), bis-3,5,5-trimethylhexanoyl peroxide (60° C.), lauroyl peroxide (61° C.), benzoyl peroxide (72° C.) and p-chlorobenzoyl peroxide (75° C.); peroxy esters such as 2,4,4-trimethylpentyl peroxyneodecanoate (41° C.), α-cumyl peroxyneodecanoate (38° C.), t-butyl peroxyneodecanoate (47° C.), t-butyl peroxyneohexanoate (54° C.), t-butyl peroxypivalate (56° C.), 1,1,3,3-tetramethylbutyl peroxy-2-ethylhexanoate (64° C.), t-amylperoxy 2-ethylheoxanoate (70° C.), t-butylperoxy 2-ethylhexanoate (74° C.), t-butyl peroxyisobutyrate (78° C.), di-t-butyl peroxyhexahydroterephthalate (83° C.), t-butyl peroxy-3,5,5-trimethylhexanoate (100° C.), t-butyl peroxyacetate (103° C.) and t-butyl peroxybenzoate (105° C.); peroxycarbonates such as di-3-methoxybutyl peroxydicarbonate (43° C.), di-2-ethylhexyl peroxydicarbonate (44° C.), bis(4-t-butylcyclohexyl)peroxydicarbonate (44° C.), diisopropyl peroxydicarbonate (45° C.), t-butyl peroxyisopropylcarbonate (97° C.), 1,6-bis(t-butylperoxycarbonyloxy)hexane (97° C.) and diethylene glycol bis(t-butylperoxycarbonate) (97° C.); dialkyl peroxides such as dicumyl peroxide (117° C.); peroxyketals such as 1,1-di-t-butylperoxy-3,3,5-trimethylcyclohexane (95° C.), 1,1-di-t-butylperoxycyclohexane (97° C.), 2,2-di-(t-butylperoxy)butane (102° C.), 4,4-di-t-butylperoxyvaleric acid-n-butyl ester (110° C.) and 2,2-bis(4,4-di-t-butylperoxycyclohexyl)propane (92° C.); ketone peroxides such as methyl ethyl ketone peroxide (105° C.); and azo compounds such as 2,2'-azobisisobutyronitrile (64° C.), 2,2'-azobis(2,4-dimethylvaleronitrile) (52° C.) and 2,2'-azobis(2-methylbutyronitrile) (67° C.).

They may be used alone or in combination. It is preferred to use a combination of a thermopolymerization initiator having a 10-hour half-life temperature lower than 50° C. and a thermopolymerization initiator having a 10-hour half-life temperature of 50° C. or higher because the degree of polymerization can be raised and a lens having excellent photochromic properties and high hardness and strength (toughness) can be obtained. It is the most preferred to use a combination of a peroxy ester having a 10-hour half-life temperature lower than 50° C. and a peroxy ester having a 10-hour half-life temperature of 50° C. or higher out of the above peroxy esters because the degree of polymerization can be further raised and a lens having more excellent photochromic properties and higher hardness and strength (toughness) can be obtained. Particularly preferred combinations of these include a combination of t-butyl peroxyneodecanoate (47° C.) and 1,1,3,3-tetramethylbutyl peroxy-2-ethylhexanoate (64° C.), a combination of t-butyl peroxyneodecanoate (47° C.) and t-butylperoxy 2-ethylhexanoate (74° C.), and a combination of t-butyl peroxyneodecanoate (47° C.) and t-amylperoxy 2-ethylhexanoate (70° C.).

The amount of the thermopolymerization initiator is not particularly limited but preferably 0.001 to 10 parts by mass, particularly preferably 0.01 to 3 parts by mass based on 100 parts by mass of the total of all the polymerizable monomers in order to fully promote polymerization and prevent an excess of the thermopolymerization initiator from remaining in the cured product. The amounts of a thermopolymerization initiator having a 10-hour half-life temperature lower than 50° C. and a thermopolymerization initiator having a 10-hour half-life temperature of 50° C. or higher are preferably 0.01 to 5 parts by mass and 0.001 to 0.5 part by mass, more preferably 0.1 to 3 parts by mass and 0.01 to 0.3 part by mass, particularly preferably 0.5 to 1.5 parts by mass and 0.03 to 0.15 part by mass based on 100 parts by mass of the total of all the polymerizable monomers, respectively.

Examples of the photopolymerization initiator include benzoin, benzoin methyl ether, benzoin butyl ether, benzophenol, acetophenone, 4,4'-dichlorobenzophenone, diethoxyacetophenone, 2-hydroxy-2-methyl-1-phenylpropan-1-one, benzyl methyl ketal, 1-(4-isopropylphenyl)-2-hydroxy-2-methylpropan-1-one, 1-hydroxycyclohexylphenyl ketone, 2-isopropylthioxanthone, bis(2,4,6-trimethylbenzoyl)phenylphosphine oxide and bis(2,6-dimethoxybenzoyl)-2,4,4-trimethylpentylphosphine oxide.

The amount of the photopolymerization initiator is not particularly limited but preferably 0.001 to 10 parts by mass, particularly preferably 0.01 to 3 parts by mass based on 100 parts by mass of the total of all the polymerizable monomers in order to fully promote polymerization and prevent an excess of the photopolymerization initiator from remaining in the cured product.

The thermopolymerization initiator and the photopolymerization initiator may be used alone or in combination. The total amount of these polymerization initiators is 0.001 to 10 parts by mass based on 100 parts by mass of the total of all the polymerizable monomers.

A detailed description is subsequently given of the method of preparing the polymerization curable composition and the method of manufacturing a cured product from the polymerization curable composition.

Although the method of preparing the polymerization curable composition is not particularly limited, 10 to 80 mass % of a bifunctional polymerizable monomer represented by the above formula (1), 1 to 15 mass % of a polyfunctional polymerizable monomer represented by the above formula (2) and 5 to 89 mass % of other polymerizable monomer are fully stirred and mixed together to obtain 100 parts by mass of the polymerizable monomer composition, 0.001 to 5 parts by mass of a photochromic compound is added to and fully dissolved in the above polymerizable monomer composition by stirring, further 0.001 to 0.5 part by mass of a light stabilizer which is a compound having a 2,2,6,6-tetramethyl-4-piperidyl skeleton is added to and fully mixed with the resulting product under agitation to prepare the polymerization curable composition. The other method may be used such as one in which after 0.001 to 0.5 part by mass of the light stabilizer which is a compound having a 2,2,6,6-tetramethyl-4-piperidyl skeleton is mixed with the polymerizable monomers under agitation, 0.001 to 5 parts by mass of the photochromic compound may be added and dissolved in the resulting mixture by stirring.

The method of manufacturing a cured product from the polymerization curable composition is not particularly limited but a method in which a thermopolymerization initiator is used will be described hereinbelow.

The above initiator is added to the polymerization curable composition and stirred. The agitation temperature and time are 0 to 40° C. and 0.1 to 300 minutes, respectively. Then, the resulting mixture is degassed under reduced pressure to remove the dissolved oxygen which impedes polymerization. The degree of pressure and the degassing time are 760 mmHg or less and 0.1 to 300 minutes, respectively. The resulting mixture is injected into the space formed by two glass molds and a gasket or tape. At this point, a filter does not need to be always used. However, by injecting the resulting mixture through a 10 μm or less, preferably 3 μm or less, particularly preferably 1 μm or less mesh filter, a cured product having high strength (toughness) can be obtained advantageously. As for the gasket, gaskets made of various materials may be used but a gasket made of an ethylene-vinyl acetate copolymer, especially an ethylene-vinyl acetate copolymer having a vinyl acetate content of 10 to 20% or a polyolefin elastomer is preferred because they are easily handled with low costs and have high quality such as excellent following ability during polycondensation or excellent thermal resistance.

A description is subsequently given of the step of curing the injected polymerization curable composition by thermopolymerization. Although the polymerization time and temperature are not particularly limited, it is preferred that polymerization should proceed slowly by gradually raising the temperature from a low temperature in order to obtain a cured product having high hardness and strength (toughness) and excellent moldability (no defects such as a stria and peeling) as a lens. As a preferred example of the polymerization curing conditions, there is a method of manufacturing a cured product, comprising the step (1) of gelling the composition by keeping it at 40° C. or lower for 1 to 48 hours, the step (2) of curing the composition by raising the temperature up to 80° C. or higher over 2 to 24 hours, and the step (3) of keeping the cured product at 80° C. or higher for 1 to 10 hours to proceed with curing until the residual ratio of the polymerization initiator becomes 30% or less. The step of cooling to a predetermined temperature may be added to the above method. The residual ratio R of the polymerization initiator is a value calculated from the following expression.

$$R = e^{-K_d \cdot s}$$

wherein $K_d = A \cdot e^{-Ea/RT}$ (A is the intrinsic frequency factor of a polymerization initiator (unit: $hr^{-1}$), Ea is the intrinsic activation energy of the polymerization initiator (unit: kJ/mol), $R = 8.314 \times 10^{-3}$ (unit: kJ/mol/K), T=(273.15+centigrade scale) (unit: K) and s is a time (unit: hr).

The above residual ratio is calculated by integrating all the steps for carrying out polymerization.

When the time of the above step (1) is shorter than 1 hour, there may occur a problem with the moldability of a lens. That is, a stria or peeling may occur. Further, a cured product having low strength (toughness) is obtained. When the time of the step (2) is shorter than 2 hours, there may occur a problem with the moldability of a lens as well, and a cured product having poor strength (toughness) may be obtained. When the time of the above step (3) is shorter than 1 hour, a cured product having low hardness and strength may be obtained. When the residual ratio of the polymerization initiator exceeds 30%, a cured product having low strength is obtained, and when the cured product is used as a lens for a long time, the photochromic compound decomposes and thereby photochromic properties deteriorate.

As particularly preferred examples of the polymerization curing conditions, the composition is kept at 33° C. for 8 hours, heated up to 40° C. over 4 hours, up to 55° C. over 4 hours and up to 90° C. over 2 hours, maintained at 90° C. for 5 hours and cooled to 80° C. over 1 hour (24 hours in total), or it is kept at 33° C. for 4 hours, heated up to 40° C. over 4 hours, up to 55° C. over 4 hours and up to 90° C. over 2 hours, maintained at 90° C. for 2 hours and cooled to 80° C. over 1 hour (17 hours in total).

After the composition is cured by polymerization, the gasket or tape is removed, and air is injected into the gap between the cured product and the glass molds by applying a blade to remove the glass molds. Further, to remove polymerization distortion, annealing is carried out at 80 to 130° C. for 0.1 to 10 hours so as to obtain a cured product of interest.

The cured product obtained by curing the polymerization curable composition of the present invention has excellent features such as high photochromic properties, hardness and strength (toughness). Since the cured product has the above excellent features, it can be particularly advantageously used as a photochromic plastic lens matrix for optical articles, especially rimless spectacles. When the cured product of the polymerization curable composition of the present invention is used for the above purpose, a lens matrix which is molded or processed into a suitable form can be used as a lens directly or after it is subjected to surface finish. That is, it may be subjected to a treatment with a silane coupling agent or a hard coating comprising a sol component such as silicon, zirconium, antimony, aluminum, tin or tungsten, or an antireflection treatment by the deposition of a thin film of a metal oxide such as $SiO_2$, $TiO_2$ or $ZrO_2$ or by the coating of an organic polymer thin film.

As described above, the polymerization curable composition of the present invention is free from the deterioration of coloring matter after it is kept for a long time and provides a cured product having excellent photochromic properties and sufficiently high drilling strength that allows for its use in rimless spectacles.

EXAMPLES

The following examples are provided for the purpose of further illustrating the present invention but are in no way to be taken as limiting. The abbreviations and names of the compounds used in the following examples are first given below.
1. Monomers
(1) Bifunctional Monomers as Component (I-1)
BPE100: 2,2-bis(4-methacryloyloxypolyethoxyphenyl)propane (average value of (m+n) is 2.6)
BPE200: 2,2-bis(4-methacryloyloxypolyethoxyphenyl)propane (average value of (m+n) is 4)
BPE500: 2,2-bis(4-methacryloyloxypolyethoxyphenyl)propane (average value of (m+n) is 10)
(2) Polyfunctional Monomers as Component (I-2)
TMPT: trimethylolpropane trimethacrylate
TMPT3EO: ethoxylated trimethylolpropane trimethacrylate
(3) Monomers as Component (I-3)
corresponding to component (A)
A200: tetraethylene glycol diacrylate
A400: nonaethylene glycol diacrylate
PKA5009: methoxy polyethylene glycol allyl ether having an average molecular weight of 550
corresponding to component (C)
4G: tetraethylene glycol dimethacrylate
monomers other than components (A) and (C)
M90G: methyl ether polyethylene glycol methacrylate having an average molecular weight of 475
GMA: glycidyl methacrylate
αMS: α-methylstyrene
MSD: α-methylstyrene dimer
EB1830: hexafunctional polymerizable polyester oligomer
2. Photochromic Compound
chromene 1: compound having the following structure. The fading half-life of this compound in an ethylene glycol dimethyl ether (EGDME) solution is 0.4 minute.

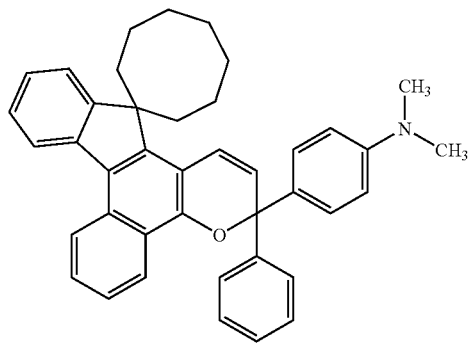 [SMILES: CN(C)c1ccc(C2(c3ccccc3)C=Cc3c4c(c5ccccc5c3O2)-c2ccccc2C42CCCCCCC2)cc1]

Chromene 2: compound having the following structure. The fading half-life of this compound in an ethylene glycol dimethyl ether (EGDME) solution is 0.3 minute.

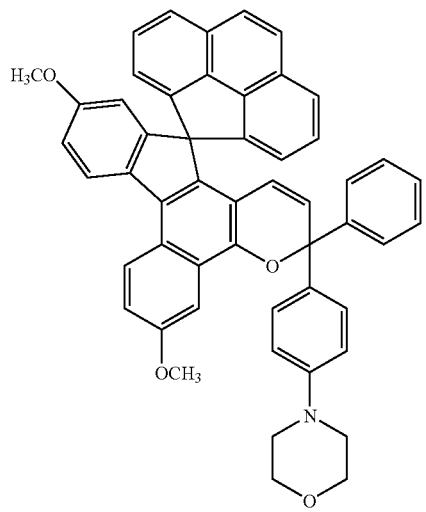 [SMILES: COc1ccc2c(c1)C1(c3c4c(c5cc(OC)ccc5c3-2)OC(c2ccccc2)(c2ccc(N3CCOCC3)cc2)C=C4)c2cccc3ccc4cccc1c4c23]

Chromene 3: compound having the following structure. The fading half-life of this compound in an ethylene glycol dimethyl ether (EGDME) solution is 0.2 minute.

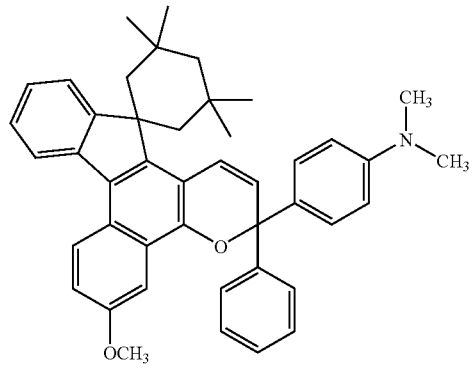 [SMILES: COc1ccc2c3c(c4c(c2c1)OC(c1ccccc1)(c1ccc(N(C)C)cc1)C=C4)C1(CC(C)(C)CC(C)(C)C1)c1ccccc1-3]

3. Light Stabilizer
light stabilizers which are compounds having a 2,2,6,6-tetramethyl-4-piperidyl skeleton
LS765: bis(1,2,2,6,6-pentamethyl-4-piperidyl)sebacate
LS770: bis(2,2,6,6-tetramethyl-4-piperidyl)sebacate
LS744: 4-benzoyloxy-2,2,6,6-tetramethylpiperidine
Other Light Stabilizers
TINUVIN571: 2(2H-benzotriazol-2-yl)-6-dodecyl-4-methylphenol
TINUVIN120: 2,4-di-tert-butylphenyl-3,5-di-tert-butyl-4-hydroxybenzoate
4. Thermopolymerization Initiator
t-butyl peroxyneodecanoate (10-hour half-life temperature of 47° C.) (effective component content of 75%)
1,1,3,3-tetramethylbutyl peroxy-2-ethylhexanoate (10-hour half-life temperature of 64° C.) (effective component content of 90%)
t-butylperoxy 2-ethylhexanoate (10-hour half-life temperature of 74° C.) (effective component content of 97%)

Example 1

50 parts by mass of BPE100, 5 parts by mass of TMPT, 24 parts by mass of 4G, 5 parts by mass of A200, 10 parts by mass of GMA, 5 parts by mass of αMS and 1 part by mass of MSD were fully mixed together. 0.03 part by mass of "chromene 1" and 0.05 part by mass of "LS765" were added to and fully mixed with the obtained mixture to prepare the composition of the present invention. Thereafter, the obtained composition was kept in an incubator maintained at 10° C. for 6 months. After the storage period, 1.33 parts by mass of t-butyl peroxyneodecanoate (effective component content of 75%) and 0.1 part by mass of t-butylperoxy 2-ethylhexanoate (effective component content of 97%) were added to and fully mixed with the composition taken out from the incubator as thermopolymerization initiators, and the resulting mixture was degassed and filtered by a 1 μm-mesh cellulose filter to be injected into a mold composed of glass molds and a gasket made of an ethylene-vinyl acetate copolymer. It was maintained at 33° C. for 4 hours, heated up to 40° C. over 4 hours, up to 55° C. over 4 hours and up to 90° C. over 2 hours, maintained at 90° C. for 2 hours and cooled to 80° C. over 1 hour (as for the residual ratios of the initiators at this point, the calculated value of t-butyl peroxyneodecanoate was 0% and that of t-butylperoxy 2-ethylhexanoate was 2%). After polymerization, the cured product was removed from the glass molds and annealed at 110° C. for 2 hours. The photochromic properties, strength characteristics and yellowing factor of the obtained cured product were evaluated. The evaluation results are shown in Table 1.

The photochromic properties, strength characteristics and yellowing factor of the cured product were evaluated by the following methods.

(1) Strength Characteristics

A disk-like test sample having a thickness of 2 mm and a diameter of 5 cm was formed from the obtained cured product, two 2 mm-diameter holes were drilled in the test sample with points 4 mm away from the periphery of the test sample and existent on a straight line corresponding to the diameter of the disk-like test sample as centers thereof, 1.6 mm-diameter stainless steel rods were inserted into the two holes and fixed to the upper and lower chucks of a tensile tester, respectively, while the rods were inserting into the test sample, and a tensile test was carried out at a rate of 5 mm/min to measure the tensile strength of the test sample.

(2) Yellowing Factor

The yellowness index (YI) of a cured product manufactured from the composition kept in an incubator set at 10° C. for 6 months and the yellowness index ($YI_0$) of a cured product manufactured from a newly prepared composition (not kept) were measured by using the color computer of Suga Shikenki Co., Ltd. to calculate its yellowing factor ($\Delta YI$)=(YI)−($YI_0$).

(3) Photochromic Properties

A beam was applied to the obtained cured product (disk-like product having a thickness of 2 mm and a diameter of 5 cm) from the L-2480 (300 W) SHL-100 xenon lamp of Hamamatsu Photonics Co., Ltd. through an aeromass filter (of Corning Co., Ltd.) at 20° C.±1° C. and a beam intensity on the surface of a polymer of 2.4 mw/cm$^2$ at 365 nm and 24 μW/cm$^2$ at 245 nm for 120 seconds to develop a color so as to measure the photochromic properties of the above sample. Photochromic properties were measured by the following methods.

(i) maximum absorption wavelength (λmax): maximum absorption wavelength after color development measured by the spectrophotometer (MCPD1000 instantaneous multi-channel photodetector) of Otsuka Denshi Kogyo Co., Ltd. The maximum absorption wavelength is connected with the tone of a developed color.

(ii) Color development density {ε(120)−ε(0)}: difference {ε(120)−ε(0)} between absorbance at the maximum absorption wavelength {ε(120)} after 120 seconds of exposure and the above absorbance {ε(0)}. As this value becomes larger, photochromism improves.

(iii) Fading half-life [$t_{1/2}$(min.)]: time required for absorbance at the maximum wavelength of the sample to drop to half of {ε(120)−ε(0)} when exposure is stopped after 120 seconds of exposure. As this time becomes shorter, the fading rate increases and photochromism improves.

For your reference, a composition prepared similarly was polymerized in the same manner right after preparation and the obtained cured product was evaluated likewise. The results were almost the same as those of a composition kept for 6 months in all the evaluation items.

Example 2

20 parts by mass of BPE100, 5 parts by mass of TMPT, 54 parts by mass of 4G, 5 parts by mass of A200, 10 parts by mass of GMA, 5 parts by mass of αMS and 1 part by mass of MSD were fully mixed together. 0.03 part by mass of "chromene 1" and 0.05 part by mass of "LS765" were added to and fully mixed with the obtained mixture to prepare the composition of the present invention. Thereafter, the obtained composition was kept in an incubator maintained at 10° C. for 6 months. After the storage period, 1.33 parts by mass of t-butyl peroxyneodecanoate (effective component content of 75%) and 0.05 part by mass of 1,1,3,3-tetramethylbutyl peroxy-2-ethylhexanoate (effective component content of 90%) were added to and fully mixed with the composition taken out from the incubator as thermopolymerization initiators, and the resulting mixture was degassed and filtered by a 1 μm-mesh cellulose filter to be injected into a mold composed of glass molds and a gasket made of an ethylene-vinyl acetate copolymer. It was maintained at 33° C. for 8 hours, heated up to 40° C. over 4 hours, up to 55° C. over 4 hours and up to 90° C. over 2 hours, maintained at 90° C. for 5 hours and cooled to 80° C. over 1 hour (as for the residual ratios of the initiators at this point, the calculated values of t-butyl peroxyneodecanoate and 1,1,3,3-tetramethylbutyl peroxy-2-ethylhexanoate were both 0%). After polymerization, the cured product was removed from the glass molds and annealed at 110° C. for 2 hours. The obtained cured product was evaluated in the same manner as in Example 1. The evaluation results are shown in Table 1. In this example, polymerization was carried out right after the preparation of the composition as a reference experiment and the evaluation results of the cured product were almost the same as those of the cured product which was kept for 6 months in all the items.

Examples 3 to 12 and Comparative Examples 1 to 8

Compositions were prepared, kept and polymerized in the same manner as in Example 1 except that their compositions were changed as shown in Table 1, and the obtained cured products were evaluated in the same manner as in Example 1. The results are shown in Table 1. The evaluation results of the cured products were almost the same as those of the cured product which was kept for 6 months except yellowing factor.

It is found from the examples of Table 1 that the cured product obtained from the polymerization curable composition of the present invention has excellent photochromic properties and strength that allows for its use in rimless spectacles and that even a cured product obtained after the polymerization curable composition is kept at 10° C. for 6 months has almost the same yellowing factor as a cured product obtained without being kept. It is understood from Comparative Examples 1 to 6 that when a composition which has monomer composition within the scope specified by the present invention and which does not contain a compound represented by the above formula (3) as a light stabilizer is cured after it is kept for a long time, the cured product is colored with a large yellowing factor under no illumination. It is also understood from Comparative Examples 7 and 8 that a cured product obtained by using a bifunctional monomer as the component (I-1), a polyfunctional monomer as the component (I-2) and a monomer (I-3) in a ratio outside the range specified by the present invention cannot obtain satisfactory photochromic properties or has reduced strength.

TABLE 1

| No. | Component (I-1) (parts by mass) | Component (I-2) (parts by mass) | Component (I-3) (parts by mass) | Light stabilizer (parts by mass) | Photochromic compound (parts by mass) |
|---|---|---|---|---|---|
| Ex. 1 | BPE100 50 | TMPT 5 | 4G/A200/GMA/αMS/MSD 24/5/10/5/1 | LS765 0.05 | Chromene 1 0.03 |
| Ex. 2 | BPE100 20 | TMPT 5 | 4G/A200/GMA/αMS/MSD 54/5/10/5/1 | LS765 0.05 | Chromene 1 0.03 |
| Ex. 3 | BPE100/BPE500 15/10 | TMPT 5 | 4G/A200/GMA/αMS/MSD 49/5/10/5/1 | LS765 0.05 | Chromene 1 0.03 |
| Ex. 4 | BPE100 50 | TMPT 10 | 4G/A200/GMA/αMS/MSD 22/2/10/5/1 | LS765 0.05 | Chromene 1 0.03 |
| Ex. 5 | BPE100/BPE500 5/30 | TMPT 5 | 4G/A200/GMA/αMS/MSD 39/5/10/5/1 | LS765 0.05 | Chromene 1 0.03 |
| Ex. 6 | BPE100 50 | TMPT3E0 15 | 4G/A200/GMA/αMS/MSD 9/10/10/5/1 | LS765 0.05 | Chromene 1 0.03 |
| Ex. 7 | BPE200 20 | TMPT 5 | 4G/M90G/GMA/αMS/MSD 44/15/10/5/1 | LS765 0.05 | Chromene 2 0.03 |
| Ex. 8 | BPE200 40 | TMPT 5 | 4G/A200/GMA/αMS/MSD 34/5/10/5/1 | LS770 0.05 | Chromene 2 0.03 |
| Ex. 9 | BPE100 50 | TMPT 5 | 4G/A200/GMA/αMS/MSD 24/5/10/5/1 | LS765 0.05 | Chromene 3 0.03 |
| Ex. 10 | BPE100 20 | TMPT 5 | 4G/A200/GMA/αMS/MSD/EB1830 39/5/10/5/1/15 | LS765 0.05 | Chromene 1 0.03 |
| Ex. 11 | BPE100 40 | TMPT 7 | 4G/A200/GMA/αMS/MSD/PKA5009 30/5/10/5/1/2 | LS765 0.05 | Chromene 1 0.03 |
| Ex. 12 | BPE200 40 | TMPT 5 | 4G/A200/GMA/αMS/MSD 34/5/10/5/1 | LS774 0.05 | Chromene 2 0.03 |

| No. | Component (I-1) (parts by mass) | Component (I-2) (parts by mass) | component (I-3) (parts by mass) | light stabilizer (parts by mass) | photochromic compound (parts by mass) |
|---|---|---|---|---|---|
| C. Ex. 1 | BPE100 50 | TMPT 5 | 4G/A200/GMA/αMS/MSD 24/5/10/5/1 | — | Chromene 1 0.03 |
| C. Ex. 2 | BPE100 20 | TMPT 5 | 4G/A200/GMA/αMS/MSD 54/5/10/5/1 | — | Chromene 1 0.03 |
| C. Ex. 3 | BPE100/BPE500 15/10 | TMPT 5 | 4G/A200/GMA/αMS/MSD 49/5/10/5/1 | — | Chromene 1 0.03 |
| C. Ex. 4 | BPE100 50 | TMPT 10 | 4G/A200/GMA/αMS/MSD 22/2/10/5/1 | — | Chromene 1 0.03 |
| C. Ex. 5 | BPE100 50 | TMPT 10 | 4G/A200/GMA/αMS/MSD 19/5/10/5/1 | TINUVIN571 0.05 | Chromene 1 0.03 |
| C. Ex. 6 | BPE100 20 | TMPT 5 | 4G/A200/GMA/αMS/MSD 57/2/10/5/1 | TINUVIN120 0.05 | Chromene 2 0.03 |
| C. Ex. 7 | BPE100 50 | TMPT 20 | 4G/A200/GMA/αMS/MSD 9/5/10/5/1 | LS765 0.05 | Chromene 1 0.03 |
| C. Ex. 8 | — | TMPT 15 | 4G/A200/GMA/αMS/MSD 64/5/10/5/1 | LS765 0.05 | Chromene 2 0.03 |

| No. | Deterioration of coloring matter Yellowing factor ($\Delta YI$) | strength characteristics tensile strength (Kgf) | photochromic properties | | | |
|---|---|---|---|---|---|---|
| | | | $\lambda max$ (nm) | color development density | in cured product $t_{1/2}$ (min) | in EGDME $t_{1/2}$ (min) |
| Example 1 | −0.1 | 33 | 588 | 1.4 | 1.9 | 0.4 |
| Example 2 | −0.3 | 26 | 588 | 1.3 | 2.0 | 0.4 |
| Example 3 | −0.2 | 26 | 588 | 1.3 | 2.0 | 0.4 |
| Example 4 | −0.2 | 20 | 588 | 1.4 | 1.8 | 0.4 |
| Example 5 | −0.2 | 27 | 588 | 1.3 | 2.0 | 0.4 |
| Example 6 | −0.3 | 32 | 588 | 1.4 | 2.1 | 0.4 |
| Example 7 | −0.2 | 24 | 592 | 0.9 | 1.6 | 0.3 |
| Example 8 | −0.1 | 32 | 592 | 1.0 | 1.6 | 0.3 |
| Example 9 | −0.1 | 33 | 598 | 0.9 | 1.1 | 0.2 |
| Example 10 | −0.3 | 28 | 588 | 1.3 | 2.0 | 0.4 |
| Example 11 | −0.3 | 30 | 599 | 1.4 | 1.9 | 0.4 |
| Example 12 | 0.0 | 32 | 592 | 1.0 | 1.6 | 0.3 |

Ex.: Example
C. Ex.: Comparative Example

The invention claimed is:

1. A polymerization curable composition comprising:
   (I) 100 parts by mass of a polymerizable monomer composition consisting of:
      (I-1) 10 to 80 mass % of a bifunctional polymerizable monomer represented by the following formula (1),

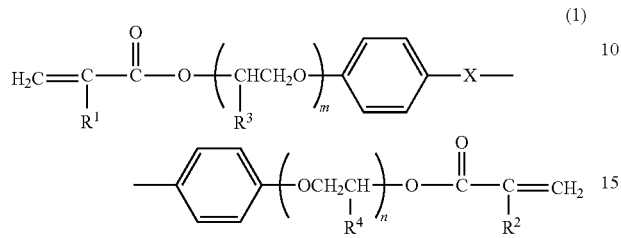

wherein $R^1$ and $R^2$ are each independently a hydrogen atom or methyl group, $R^3$ and $R^4$ are each independently hydrogen atom or alkyl group having 1 or 2 carbon atoms, —X— is —O—, —S—, —S(=O)$_2$—, —C(=O)—O—, —CH$_2$—, —CH=CH— or —C(CH$_3$)$_2$—, and m and n are each independently an integer which satisfies (m+n)=2 to 30,
      (I-2) 1 to 15 mass % of a polyfunctional polymerizable monomer represented by the following formula (2),

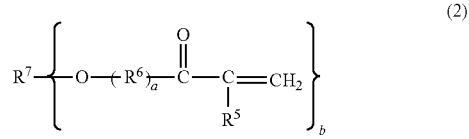

wherein $R^5$ is a hydrogen atom or methyl group, —$R^6$— is —CH$_2$CH$_2$O—, —CH$_2$CH(CH$_3$)O— or —C(=O)CH$_2$CH$_2$CH$_2$CH$_2$CH$_2$O—, $R^7$ is a tervalent to hexavalent organic residue, a is an integer of 0 to 3, and b is an integer of 3 to 6; and
      (I-3) 5 to 89 mass % of a polymerizable monomer other than (I-1) and (I-2);
   (II) 0.001 to 5 parts by mass of a photochromic compound; and
   (III) 0.001 to 0.5 part by mass of a light stabilizer which is a compound having a 2,2,6,6-tetramethyl-4-piperidyl skeleton.

2. The polymerization curable composition according to claim 1, wherein the compound having a 2,2,6,6-tetramethyl-4-piperidyl skeleton is a compound represented by the following formula (3):

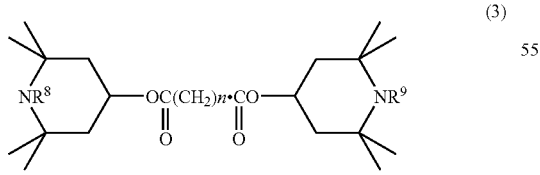

wherein $R^8$ and $R^9$ are each independently a hydrogen atom or methyl group, and n is an integer of 5 to 12.

3. A polymerization curable composition prepared by adding 0.001 to 10 parts by mass of a thermopolymerization initiator to 100 parts by mass of the polymerization curable composition of claim 1 or 2.

4. The polymerization curable composition according to claim 3, wherein 0.01 to 5 parts by mass of a thermopolymerization initiator having a 10-hour half-life temperature lower than 50° C. and 0.001 to 0.5 part by mass of a thermopolymerization initiator having a 10-hour half-life temperature of 50° C. or higher are added as thermopolymerization initiators.

5. The polymerization curable composition according to claim 1, wherein the photochromic compound is a compound represented by the following formula (4):

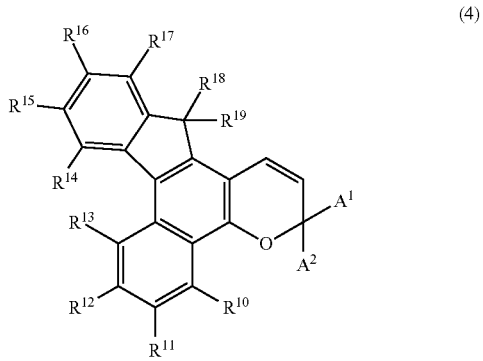

wherein $R^{10}$, $R^{11}$, $R^{12}$, $R^{13}$, $R^{14}$, $R^{15}$, $R^{16}$, $R^{17}$, $R^{18}$ and $R^{19}$ are each independently a hydrogen atom, alkyl group, alkoxy group, aralkoxy group, substituted amino group, cyano group, halogen atom, aralkyl group, aryl group which may have a substituent, or nitrogen substituted cyclic compound such as morpholino, piperidino or piperazino, $R^{18}$ and $R^{19}$ may be bonded together to form a cycloalkyl which may have a substituent, and $A^1$ and $A^2$ are each independently a hydrogen or aryl group which may have a substituent.

6. The polymerization curable composition according to claim 1, wherein the light stabilizer prevents the deterioration of the photochromic compound during storage of the polymerization curable composition.

7. A cured product obtained by polymerizing the polymerization curable composition of claim 1 or 2.

8. A method of manufacturing a cured product, comprising thermopolymerizing the polymerization curable composition of claim 1 or 2.

9. A method of manufacturing a cured product, comprising adding 0.001 to 10 parts by mass of a thermopolymerization initiator to 100 parts by mass of the polymerization curable composition of claim 1 or 2 and thermopolymerizing the composition through:
   the step (1) of gelling the composition by maintaining the temperature at 40° C. or lower for 1 to 48 hours,
   the step (2) of curing the composition by increasing the temperature to 80° C. or higher over 2 to 24 hours, and
   the step (3) of further curing the composition until the residual ratio of the polymerization initiator becomes 30% or less by maintaining the temperature at 80° C. or higher for 1 to 10 hours.

10. The method of manufacturing the cured product of claim 9, wherein 0.01 to 5 parts by mass of a thermopolymerization initiator having a 10-hour half-life temperature lower than 50° C. and 0.001 to 0.5 part by mass of a thermopolymerization initiator having a 10-hour half-life temperature of 50° C. or higher are added as thermopolymerization initiators.

* * * * *